United States Patent [19]

Andrepont et al.

[11] Patent Number: 5,231,811
[45] Date of Patent: Aug. 3, 1993

[54] STORAGE STRUCTURES WITH LAYERED THERMAL FINISH COVERING

[75] Inventors: John S. Andrepont, Naperville; Robert J. Bannon, Crest Hill; Michael P. Duff, Joliet, all of Ill.

[73] Assignee: Chicago Bridge & Iron Technical Services Company, Oak Brook, Ill.

[21] Appl. No.: 851,934

[22] Filed: Mar. 16, 1992

[51] Int. Cl.$^5$ ............................................. E04B 1/80
[52] U.S. Cl. ..................................... 52/249; 52/405; 220/565; 220/455
[58] Field of Search ............ 52/249, 405, 309.8, 52/309.14, 309.17; 220/565, 444, 453, 455, 466

[56] References Cited

U.S. PATENT DOCUMENTS

| | | | |
|---|---|---|---|
| 2,172,076 | 9/1939 | Wolf et al. | 106/18 |
| 2,275,272 | 3/1942 | Scripture, Jr. | 25/154 |
| 3,138,472 | 6/1964 | Sommer | 106/88 |
| 3,522,069 | 7/1970 | Checko et al. | 106/88 |
| 3,548,453 | 12/1970 | Garis | 18/5 |
| 3,867,159 | 2/1975 | Ergene | 106/88 |
| 3,878,658 | 4/1975 | Davis et al. | 52/410 |
| 3,991,842 | 11/1976 | Larsen | 180/1 |
| 4,062,468 | 12/1977 | Bongiovanni | 220/444 |
| 4,256,500 | 3/1981 | Turpin, Jr. | 106/88 |
| 4,373,955 | 2/1983 | Bouchard et al. | 106/88 |
| 4,683,696 | 8/1987 | Thoeny | 52/249 |

OTHER PUBLICATIONS

Dryvit DS201 booklet entitled "Outsulation—Exterior Wall Insulation and Finish System"; Copyright Dryvit Systems, Inc. 1991.
"Primus/Adhesive" dryvit DS414; ©Dryvit Systems, Inc. 1990 (single sheet).
"Prymit Primer/Adhesion" Promoter dryvit DS424; ©Dryvit Systems, Inc. 1989 (single sheet).
"Finishes 100% Pure Acrylic Based Finish Coatings" dryvit DS416; ©Dryvit Systems, Inc. 1989 (single sheet).
Dryvit Systems, Inc. Dec. 1990, Material Safety Data Sheet for six products with the first being "Quarzputz Finish" (single sheet).
Dryvit Systems, Inc. Dec. 1990 Material Safety Data Sheet for three products with the first being "Primus-/Adhesive" (single sheet).
"Reinforcing Mesh" dryvit DS413; ©Dryvit Systems, Inc. 1990 (single sheet).
Material Safety Data Sheet Jul. 23, 1990 for "Inorganic Glass Fiber Mesh"; Dryvit Systems, Inc. (single sheet).
Preliminary Technical Data Sheet for BQ 84 B "Vapor Barrier Coating"; Childers Products Company.
Foster Products Corporation Product Data; "Vapor Barrier Coating" mastic 30-90 (three sheets).

*Primary Examiner*—Carl D. Friedman
*Assistant Examiner*—Christopher T. Kent
*Attorney, Agent, or Firm*—Marshall, O'Toole, Gerstein, Murray & Borun

[57] ABSTRACT

A storage structure, particularly for fluids but also useful for storing solids, which in one embodiment includes at least a portion thereof comprising a structural wall having opposing sides, at least one said side having an insulating and protecting built-up layered finish covering which retards heat transfer, the passage of water vapor through the insulation and/or the condensation of water on the one said side, the built-up layered finish covering including a layer of insulation positioned on the one said side of the wall; a solid unitary vapor barrier layer applied to the outer surface of the insulation board as a viscous liquid or paste which hardens into a solid layer; a reinforced stucco basecoat layer applied onto the vapor barrier layer; and a stucco topcoat layer applied onto the stucco basecoat layer.

47 Claims, 2 Drawing Sheets

STORAGE STRUCTURES WITH LAYERED THERMAL FINISH COVERING

This invention relates to storage structures and finish coverings applied thereto. More particularly, this invention pertains to fluid storage structures having layered finish coverings applied to at least one side of a structural wall thereof to thermally insulate the structure, retard the passage of water vapor and/or to prevent water condensation on the wall, and to provide the wall with an architectural appearance.

BACKGROUND OF THE INVENTION

Various types of storage structures are used for storage of gases, liquids and solids as well as in the processing of such materials. Such structures vary widely in shape and size. They can have planar surfaces, single curved surfaces such as a cylindrical surface, a double curved surface such as a spheroidal surface, and combinations of such curved surfaces. Some specific storage structures having such surfaces are cylindrical circular storage tanks having flat, conical or domed roofs and which are used extensively for petroleum product storage, water storage and ice-water slurry storage, liquefied gas storage, elevated water storage tanks including those which have a spheroidal-shaped tank supported on a single column, cylindrical water storage tanks supported on a single column, elevated tanks of various curved shapes supported by a plurality of columns or by a cylindrical vertical wall, and various storage and processing vessels of spherical shape. Such storage structures are generally made of metal plate or concrete.

Because the internal temperature of many storage structures in use is significantly, or appreciably, higher or lower than the surrounding environmental or atmospheric temperature it is desirable, and often necessary, to insulate part or all of the storage structures to retard heat transfer through the walls of the storage structures and, at times, to restrict the passage of water vapor into the insulation and/or the condensation of water on the walls beneath the insulation.

Various types of insulation have been applied to storage structures for the stated purposes. Thus, Davis et. al. U.S. Pat. No. 3,878,658 shows a system using layers of insulating board applied to a tank. Garis U.S. Pat. No. 3,548,453 and Larsen U.S. Pat. No. 3,991,842 disclose applying polyurethane foam directly onto tanks with the contemporaneous application of a metal sheet over the insulation to protect it against the weather and the penetration of water into the insulation and then to the tank wall.

While the described insulation systems serve their functional purpose often they do not radiate the architectural quality and appearance which customers desire, especially when the structures are located amongst institutional, commercial, government and residential buildings or in parks and athletic facilities. The surfaces after insulation do not have significant depth in that they lack grooves, bas-relief designs and other sculptured features and textures as would commonly be found in architectural practice.

At the present time some commercial and government buildings have exterior walls built-up in layered arrangement so as to provide thermal insulation and a pleasing exterior finish which weathers well. The exterior walls are built-up by first applying insulating board to the building substrate which, for example, may be concrete, building blocks, gypsum board and metal lath. The insulating board is held in place by mechanical fasteners or an adhesive. Then the outer surface of the insulating board, which can be rigid expanded polystyrene, is coated with a layer of synthetic stucco in which a glass fiber fabric mesh is embedded for reinforcement followed by a finish layer of synthetic stucco. The adhesive and the stucco material can be polyacrylic latex products such as those marketed by Dryvit Systems, Inc., West Warwick, R.I. Whatever vapor barrier is needed in such buildings is placed on the interior of the building, behind the inner wall as is conventional for buildings intended for habitation by humans. A polyethylene film behind the inside wall is often used as a vapor barrier to keep moisture from driving into an air conditioned building. Normally there is no vapor barrier behind or inside the outer wall of the building so that moisture can flow out of the building in the winter and not freeze and cause damage to the building.

While the described built-up layered exterior walls perform well on buildings of the types described above they cannot be applied with confidence to storage structures such as tanks because water vapor can penetrate such walls and condense on the exterior surface of the storage structure causing corrosion problems for a metal tank or for the metal reinforcement of a concrete tank, a serious loss in insulating capacity, weakening of the insulation or causing it to loosen.

It was contemplated that all one had to do to prevent vapor flow through the exterior wall was to apply a layer of conventional material used previously as a vapor barrier to seal the exterior surface or the insulation layer. However, placement of the vapor barrier coating on top of the exterior finish would largely or totally defeat the intended effect of the architectural finish. Also, conventional vapor barrier coatings, such as butyl rubber, are solvent-based and thus unacceptable as an intermediate layer due to their incompatibility with many insulation compositions, and specifically foamed polystyrene. Furthermore, prior to our discovery, no vapor barrier composition was known which could be successfully used in a built-up wall of the previously described type, either because it was incompatible with the insulation or the synthetic stucco. In addition, it was not known whether a vapor barrier layer and a stucco layer could be applied successfully in contact with, or adjacent one another, in a built-up finish covering for a storage structure wall.

SUMMARY OF THE INVENTION

According to the invention a storage structure, particularly for a fluid, is provided which includes at least a portion thereof comprising a structural wall having opposing sides, at least one said side having an insulating and protecting built-up layered finish covering which retards heat transfer, the passage of water vapor and/or the condensation of water on the one said side, the built-up layered finish covering including a layer of insulation positioned on the one said side of the wall, with said layer of insulation providing an outer surface; a solid unitary vapor barrier layer over the insulation layer; and a stucco topcoat layer over the vapor barrier layer.

The storage structure wall, for example, can be a concrete wall and/or a metal wall.

A stucco basecoat layer can be located between the vapor barrier layer and the stucco topcoat layer. Furthermore, a stucco basecoat layer can be located between the layer of insulation and the vapor barrier.

The built-up layered finish covering can also include layered arrangements according to the following sequences:

1. W A B D
2. W A B C D
3. W A C B D
4. W A C B E D
5. W A B E C D
6. W A C E B D
7. W A B E B C D
8. W A B C E D
9. W A B C E C D in which each letter represents a layer defined as follows:
W. Wall
A. Insulation layer
B. Vapor barrier layer
C. Stucco basecoat layer
D. Stucco topcoat layer
E. Second or separate insulation layer Built-up layered finish coverings in which there is a second or separate insulation layer are particularly useful for producing architectural finish coverings because the second layer can extend outwardly in the form of a moulding, trim, geometric shape or sculptured figure to provide bas-relief at various areas of the wall. The second or separate layer of insulation can vary in thickness, or not extend uniformly or continuously over the wall, thereby providing a three dimensional architectural finish covering. Of course, the same result can be obtained if the first insulation layer is thick enough to provide the desired thermal insulation at the thinnest area if it varies in thickness over the wall surface.

The invention also provides a fluid storage structure which includes at least a portion thereof comprising a structural wall having opposing sides, the structural wall being selected from the group consisting of a metal wall and a concrete wall, at least one said side having an insulating and protecting built-up layered finish covering which retards heat transfer, the passage of water vapor and/or the condensation of water on the one said side, the built-up layered finish covering including a layer of insulation positioned on the one said side of the wall with said layer of insulation providing an outer surface; a solid unitary vapor barrier layer and a stucco basecoat layer adhering to the vapor barrier layer; one of the vapor barrier layer and the stucco basecoat layer being applied to the outer surface of the layer of insulation; and a stucco topcoat layer applied onto the outermost of the vapor barrier layer and the stucco basecoat layer.

The solid unitary vapor barrier layer can be applied to the outer surface of the layer of insulation; the stucco basecoat layer can be applied onto the vapor barrier layer; and the stucco topcoat layer can be applied onto the stucco basecoat layer. Alternatively, the stucco basecoat layer can be applied onto the outer surface of the layer of insulation; and the solid unitary vapor barrier layer applied to the stucco basecoat layer.

The vapor barrier layer can be applied as a viscous liquid or paste which hardens into a solid layer. It can be reinforced, as for example, with a mesh material selected from the group consisting of a metal mesh, a glass fiber mesh and a polymeric mesh. The mesh material can be embedded in the vapor barrier layer by pressing it into the viscous liquid or paste before it solidifies.

More specifically, a storage structure is provided which includes at least a portion thereof comprising a metal plate having opposing sides, at least one said side having an insulating and protecting built-up layered finish covering which retards heat transfer through, and condensation of water on, the metal plate, the built-up layered finish covering including an adhesive layer applied to said one side of the plate; an insulation layer placed over and in adhering contact with the adhesive layer thereby adhering the insulation layer to the metal plate; a solid unitary vapor barrier layer applied to the outer surface of the insulation layer as a viscous liquid or paste which hardens into a solid layer; a stucco basecoat layer applied onto the vapor barrier layer; and a stucco topcoat layer applied onto the stucco base.

The metal plate can be steel plate, aluminum plate, chromium or nickel plated steel plate, stainless steel and other metal alloy plate.

If desirable or necessary, a binder may be applied to the metal surface followed by a bond promoting material. These two functions can be obtained simultaneously by applying an epoxy coating to the metal plate surface.

The adhesive layer can be an acrylic based latex polymer adhesive. Such an adhesive is available from Dryvit Systems, Inc., West Warwick, R.I. under the tradename PRIMUS. Portland cement, preferably Type I, may be added to the latex polymer to produce a composite adhesive which may then be applied to a metal plate structure.

The insulation layer can be a member of the group consisting of expanded rigid polymeric material and glass foam. Specifically, expanded polystyrene insulation may be used.

The vapor barrier can be applied as a water-based latex liquid or paste. Such a water-based latex is available as a mastic from Foster Products Corporation, Vadnais Heights, Minn. under the tradename VAPORSAFE.

The stucco basecoat can be a synthetic stucco. Specifically, it can be an acrylic based latex polymer adhesive or a mixture of an acrylic based latex polymer adhesive and Portland cement, desirably Portland Type I cement. The adhesive used can be PRIMUS.

The stucco basecoat layer can be reinforced with a mesh material selected from the group consisting of a metal mesh, a glass fiber mesh and a polymeric mesh embedded therein. The mesh material may be pressed into the stucco basecoat layer after it is applied and while it is still wet and before it solidifies. The mesh material can be glass fiber reinforcing mesh.

The stucco topcoat layer can be a cementitious synthetic stucco. Specifically, the stucco topcoat layer can comprise an acrylic based latex polymer adhesive or an acrylic based latex polymer adhesive containing a small sized particulate inorganic aggregate. The latex polymer adhesive used can be PRIMUS.

The prior more specific description of the invention as applied to metal plate storage structures is also applicable to storage structures having walls and the like made of other materials such as concrete and steel reinforced concrete. The insulation layer or layers can be foamed in-place insulation or made up of a plurality of precut insulation boards, blocks, strips and other shapes. When foamed-in-place insulation is used it is generally unnecessary to use an adhesive to secure the insulation onto the structural wall.

The invention as summarized is intended to be useful for essentially all storage structures whether a liquid, gas or solid is stored therein provided that the materials used in the layered finish covering is able to withstand the temperatures and other environmental conditions to which it will be subjected.

DETAILED DESCRIPTION OF THE DRAWINGS

Figure 1:
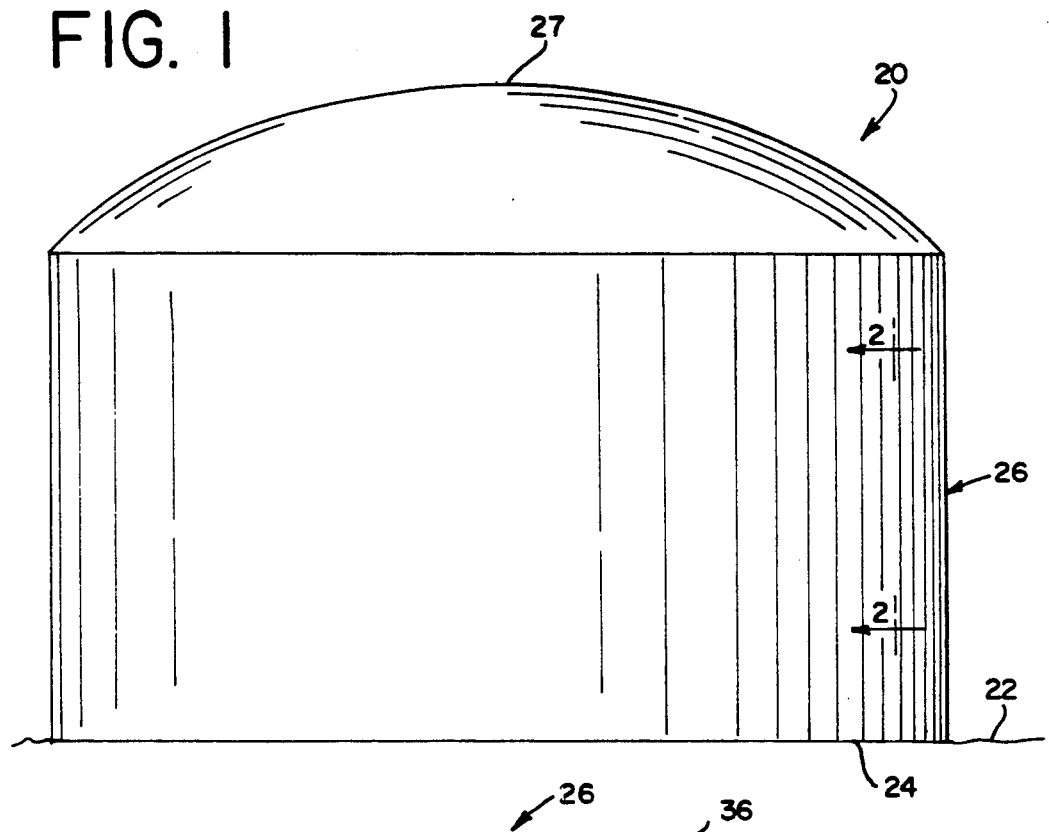
FIG. 1 is an elevational view of a storage tank for a liquid at a temperature substantially below the surrounding atmospheric temperature.

To the extent it is reasonable and practical the same or similar elements shown in the various views of the drawings will be identified by the same numbers.

The tank 20 shown in FIG. I is supported on ground 22. The tank 20 has a metal plate bottom 24, a vertical circular cylindrical metal plate side wall 26 and a metal plate domed roof 27. The side wall 26 is single curved and the domed roof 27 is double curved.

Figure 2:
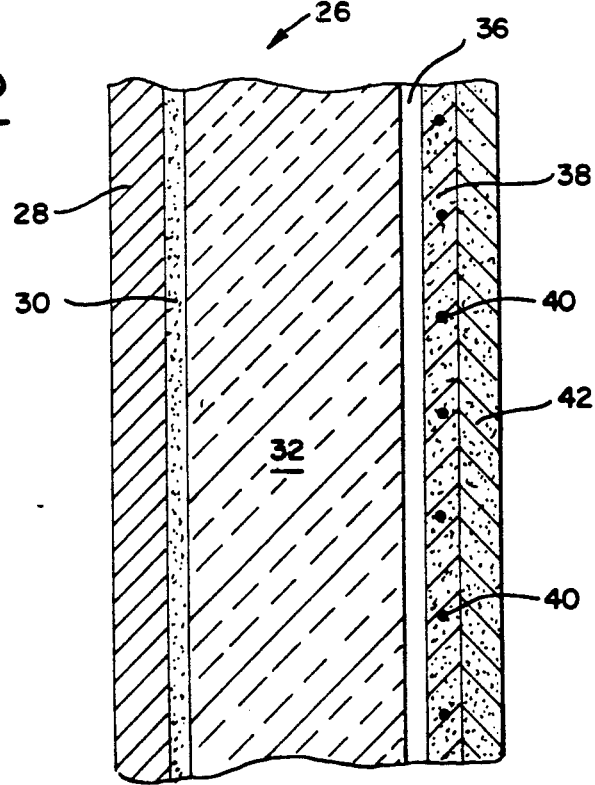
FIG. 2 is a sectional view through the wall of the tank shown in FIG. I taken along the line 2—2.

As shown in FIG. 2 the side wall 26 includes a vertical circular cylindrical metal plate 28. The metal plate 28 is thus a single curved plate.

If necessary the outer surface of metal plate 28 can be coated with a suitable primer material. Any suitable primer can be used. An adhesive bond promoter can then be applied over the primer if needed to enhance the bonding properties of the primer. An acrylic water-based primer can be used as the bonding agent. One such bonding agent is the product DRYMIT commercially available from Dryvit Systems, Inc., West Warwick, R.I. Preferably, an epoxy primer is used alone since it functions both as a primer and as a bond promoter.

After the metal surface has been prepared as described above an adhesive 30 is applied. The adhesive used for this purpose can be an acrylic based latex adhesive. One such adhesive commercially available is PRIMUS adhesive marketed by Dryvit Systems, Inc. This adhesive can be applied either to the prepared metal plate with a trowel or to the back of the insulation board or to both surfaces.

Immediately after the adhesive has been applied, and before it develops a skin, the insulation board 32 is pressed against the metal plate structure. The thickness of the insulation board and its density will depend on the desired insulation to be achieved. Generally, however, when an expanded polystyrene insulation board having a density of about 1 pound per cubic foot is used the board can be about 2 to 4 inches thick.

After the insulation board 28 is pressed in place it should remain undisturbed for about one day to permit the adhesive to dry. Then a vapor barrier layer 36 is applied to the outer surface of the insulation board 32. A water-based latex liquid or paste can be used for the vapor barrier layer 36. One such product available as a mastic which can be sprayed on or applied with a trowel is VAPOR-SAFE 30-90 supplied by Foster Products Corporation, Vadnais Heights, MN. After the vapor barrier layer 36 is applied it is permitted to dry for about one day.

Once the vapor barrier layer 36 is dry a stucco basecoat layer 38 is applied over the vapor barrier layer and then a layer of reinforcing mesh 40 is placed over the wet stucco basecoat layer 38. The reinforcing mesh 40 is pressed into the wet stucco basecoat layer 38 by troweling.

The stucco basecoat layer 38 can comprise a cementitious synthetic stucco formulated from an acrylic based latex polymer adhesive, such as PRIMUS adhesive, and Portland cement, desirably in a 1:1 ratio by weight. Portland Type I cement is preferred. The resulting stucco basecoat preparation can be applied with a trowel. The surface of the stucco basecoat 38 is smoothed with a trowel until the reinforcing mesh 40 is fully embedded. The pattern of the mesh, desirably, should not be visible. The stucco basecoat 38 should be permitted to dry undisturbed for at least one day. A stucco basecoat composition free of cementitious material can also be used, but it is more expensive and not as easily applied as is one containing cement.

The reinforcing mesh 40 used can be made of glass fibers, polymeric filaments or metal wire. It is preferred to use a woven glass fiber mesh.

After the stucco basecoat layer 38 is dry a stucco finish or topcoat layer 42 available in various colors is applied. The stucco topcoat layer 42 can be produced from an acrylic based latex polymer adhesive with or without the addition of small sized particulate inorganic aggregate thereto. One particular preparation suitable for the stucco topcoat 42 can be about 63-67% sand, 12-15% water, 8.5-10.2% acrylic latex polymer adhesive and 1-5.5% titanium dioxide (rutile) by weight. This preparation is semi-solid like a paste and can be troweled onto the stucco basecoat layer 38. The stucco topcoat will generally be about 0.06 to 0.25 inch thick when dry, which will take about one day or more after it is applied. No further treatment of the stucco topcoat layer 42 is needed although it can be painted if desired.

The double curved metal plate domed roof 27 of the tank 20 can be similarly covered with a built-up insulating layered finish covering.

Varying thickness of insulating material achieved, for example, by the use of overlaid, grooved or sculptured material, can be applied either under or over the vapor barrier layer. The exterior appearance of the built-up wall will closely replicate the profile of the insulation board before it is covered with the vapor barrier layer 36 and stucco layers 38, 42 because the combined thickness of these added layers will almost always be less than 0.4 in., and generally less than 0.25 in., thick. As a result grooves, raised ridges, cornices, depressed or sunken areas and raised areas defined by the uncoated insulation board retain such features essentially unchanged in appearance after being finished as described. This permits great variation in the final appearance of metal plate structures as a result of the application of built-up layered walls by the described system.

The insulation boards can be precut to mate the inner surface with the metal plate structure surface, whether the surface is flat, single curved, double curved or a combination of such surfaces. The outer surface of the insulation boards can be grooved or otherwise shaped or sculptured as desired before the insulation board is adhered in place. Alternatively, the insulation board can be adhered to the metal plate structure and then grooved, shaped or sculptured as desired. Of course, the insulation board can be partially sculptured before being adhered, and further sculptured after it is adhered, to the metal plate structure.

Since many metal plate structures are large it is generally necessary to apply the insulation in the form of a multitude of separate insulation board pieces. This results in many abutting joints as well as overlapping joints. Such joints are desirably reinforced with strips of reinforcing mesh embedded in vapor barrier mastic troweled into, over, and around or adjacent the joints.

The disclosed built-up layered finish covering can be applied to a wide variety of storage structures made of structural materials including concrete or metal plate having flat metal plate, single curved metal plate, double curved metal plate, and combinations thereof including tanks and vessels with flat walls, cylindrical walls, elliptical walls, spherical walls, conical walls, and egg-shaped walls made of concrete or metal plate. Additionally, the described finish covering can be applied to supporting structure for such tanks and vessels including columns for elevated storage tanks, as well as cylindrical walls, used to support some elevated storage tanks.

Clearly, the finish covering can be used to insulate tanks whether the interior temperature will be higher or lower than the prevailing exterior temperature. When so insulated, the tanks can be architecturally beautiful while simultaneously functioning for their intended purpose.

Figure 3:
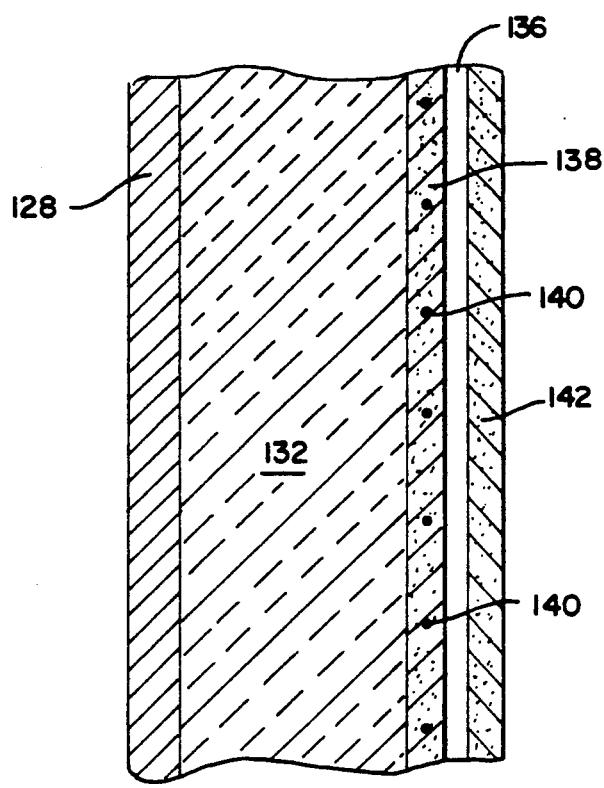
FIG. 3 is a sectional view through a wall of a storage tank like FIG. 2 but with a different sequence in the arrangement of the layers constituting the finish covering.

FIG. 3 illustrates a layered finish covering with the layers arranged in a different sequence than in FIG. 2. As shown in FIG. 3, the storage structure has a wall 128, which can be made of metal plate or concrete, on which a layer of insulation 132 is adhered by use of an adhesive or mechanical fasteners. A stucco basecoat layer 138 reinforced with a mesh 140 is applied over the insulation 132. The vapor barrier layer 136 is then applied over the stucco basecoat layer 138. Finally a stucco topcoat layer 142 is applied onto the vapor barrier layer 136.

Figure 4:
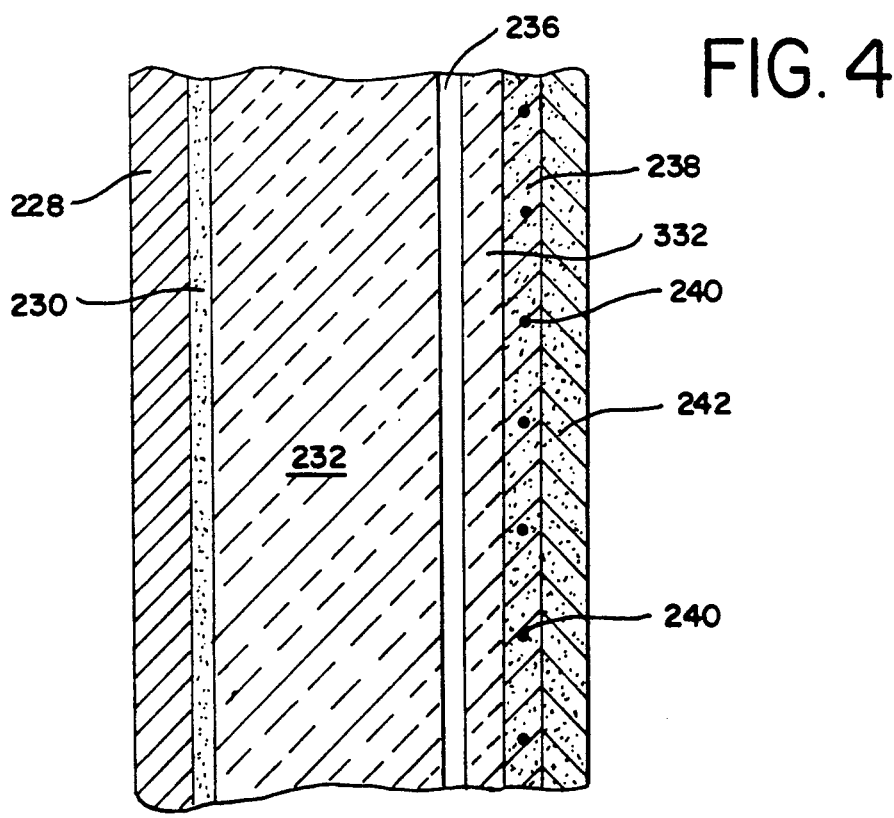
FIG. 4 is a sectional view through a wall of a storage tank like FIG. 2 but with a larger number of layers constituting the finish covering.

FIG. 4 illustrates a further embodiment of the invention. In this embodiment, insulation layer 232 is adhered to a storage structure wall 228 by an adhesive layer 230. Then a vapor barrier layer 236 is applied to the outer surface of insulation layer 232. A second insulation layer 332 is applied to the vapor barrier layer 236. A second insulation layer 332 is then positioned over the vapor barrier layer 236. A stucco basecoat layer 238 containing reinforcing mesh 240 is placed onto the second insulation layer 236. Finally, stucco topcoat layer 242 is applied onto stucco basecoat layer 238.

The finish coverings described in conjunction with FIGS. 3 and 4 can be produced using the same materials described above in connection with the finish covering illustrated by FIGS. 1 and 2.

Finish coverings provided by the invention are particularly useful on the outside surface of storage structure walls since they thermally insulate the storage structure, retard the passage of water vapor and/or prevent water condensation on the wall. The finish coverings are particularly useful on liquid storage tanks and vessels in which liquid is to be stored at a temperature below the surrounding environmental temperature. Liquid storage tanks so finished are especially useful for storing cold water or an ice slurry, cold brine or other cooled liquids, including liquefied gases.

The foregoing detailed description has been given for clearness of understanding only, and no unnecessary limitations should be understood therefrom, as modifications will be obvious to those skilled in the art.

What is claimed is:

1. A fluid storage structure which includes at least a portion thereof comprising a structural wall having opposing sides, at least one said side having an insulating and protecting built-up layered finish covering which retards heat transfer, the passage of water vapor and/or the condensation of water on the one said side, the built-up layered finish covering including:

a layer of insulation positioned on the one said side of the structural wall with said layer of insulation providing an outer surface;

a solid unitary vapor barrier layer over the insulation layer; and a stucco topcoat layer over the vapor barrier layer.

2. A fluid storage structure according to claim 1 in which the structural wall is a member of the group consisting of a concrete wall and a metal wall.

3. A fluid storage structure according to claim 1 in which:

a stucco basecoat layer is between the vapor barrier layer and the stucco topcoat layer.

4. A fluid storage structure according to claim 1 in which:

a stucco basecoat layer is between the layer of insulation and the vapor barrier.

5. A fluid storage structure according to claim 4 in which:

a separate layer of insulation is between the vapor barrier and the stucco topcoat.

6. A fluid storage structure according to claim 3 in which:

a separate layer of insulation is between the vapor barrier layer and the stucco basecoat layer.

7. A fluid storage structure according to claim 4 in which:

a separate layer of insulation is between the stucco basecoat layer and the vapor barrier layer.

8. A fluid storage structure according to claim 6 in which:

a vapor barrier layer is between the separate layer of insulation and the stucco basecoat layer.

9. A fluid storage structure according to claim 3 in which:

a separate layer of insulation is between the stucco basecoat layer and the stucco topcoat layer.

10. A fluid storage structure according to claim 9 in which:

a stucco basecoat layer is between the separate layer of insulation and the stucco topcoat layer.

11. A fluid storage structure which includes at least a portion thereof comprising a structural wall having opposing sides, the structural wall being selected from the group consisting of a metal wall and a concrete wall, at least one said side having an insulating and protecting built-up layered finish covering which retards heat transfer, the passage of water vapor and/or the condensation of water on the one said side, the built-up layered finish covering including:

a layer of insulation positioned on the one said side of the structural wall with said layer of insulation providing an outer surface;

a solid unitary vapor barrier layer and a stucco basecoat layer adhering to the vapor barrier layer;

one of the vapor barrier layer and the stucco basecoat layer being applied to the outer surface of the layer of insulation; and a stucco topcoat layer applied onto the outermost of the vapor barrier layer and the stucco basecoat layer.

12. A fluid storage structure according to claim 11 in which:

the solid unitary vapor barrier layer is applied to the outer surface of the layer of insulation;

the stucco basecoat layer is applied onto the vapor barrier layer; and the stucco topcoat layer is applied onto the stucco basecoat layer.

13. A fluid storage structure according to claim 11 in which:

the stucco basecoat layer is applied onto the outer surface of the layer of insulation; and the solid unitary vapor barrier layer is applied to the stucco basecoat layer.

14. A fluid storage structure according to claim 12 in which:

the vapor barrier layer is applied as a viscous liquid or paste which hardens into a solid layer.

15. A fluid storage structure according to claim 13 in which:

the vapor barrier layer is applied to the insulation layer as a viscous liquid or paste which hardens into a solid layer.

16. A structure according to claim 11 in which:

the stucco basecoat layer is reinforced with a mesh material selected from the group consisting of a metal mesh, a glass fiber mesh and a polymeric mesh.

17. A structure according to claim 16 in which: the mesh material is a glass fiber reinforcing mesh.

18. A structure according to claim 11 in which:

the layer of insulation is insulation board which is a member of the group consisting of expanded rigid polymeric material and glass foam.

19. A structure according to claim 18 in which: the insulation board is expanded polystyrene.

20. A structure according to claim 11 in which:

the stucco basecoat layer is a cementitious synthetic stucco; and the stucco topcoat layer is a synthetic stucco.

21. A structure according to claim 11 in which:

the vapor barrier is applied as a water-based latex liquid or paste.

22. A structure according to claim 11 in which:

the layer of insulation is adhered to the said one side of the wall by an adhesive.

23. A structure according to claim 22 in which:

the adhesive layer is an acrylic based latex polymer adhesive.

24. A structure according to claim 20 in which:

the stucco basecoat layer is a member of the group consisting of (1) an acrylic based latex polymer adhesive and (2) a mixture of acrylic based latex polymer adhesive and Portland cement.

25. A structure according to claim 24 in which:

the stucco topcoat layer comprises a member of the group consisting of acrylic based latex polymer adhesive and acrylic based latex polymer adhesive containing a small sized particulate inorganic aggregate.

26. A structure according to claim 11 in which:

the one said side is a member of the group consisting of a flat surface, single curved surface, double curved surface and combinations thereof.

27. A fluid storage structure which includes at least a portion thereof comprising a structural wall of metal plate having opposing sides, at least one said side having an insulating and protecting built-up layered finish covering which retards heat transfer through, and condensation of water on, the structural wall, the built-up layered finish covering including:

an adhesive layer applied to said one side of the plate;

a layer of insulation placed over and in adhering contact with the adhesive layer thereby adhering the insulation layer to the metal plate;

a solid unitary vapor barrier layer applied to the outer surface of the insulation layer as a viscous liquid or paste which hardens into a solid layer;

a reinforced stucco basecoat layer applied onto the vapor barrier layer; and a stucco topcoat layer applied onto the stucco basecoat.

28. A fluid storage structure according to claim 27 in which:

the stucco basecoat layer is reinforced with a mesh material selected from the group consisting of a metal mesh, a glass fiber mesh and a polymeric mesh.

29. A fluid storage structure according to claim 28 in which:

the mesh material is a glass fiber reinforcing mesh.

30. A fluid storage structure according to claim 28 in which:

the insulation layer is a member of the group consisting of expanded rigid polymeric material and glass foam.

31. A fluid storage structure according to claim 30 in which:

the insulation layer is expanded polystyrene.

32. A fluid storage structure according to claim 27 in which:

the stucco basecoat layer is a member of the group consisting of a synthetic stucco and a cementitious synthetic stucco; and the stucco topcoat layer is a synthetic stucco.

33. A fluid storage structure according to claim 27 in which:

the vapor barrier is applied as a water-based latex liquid or paste.

34. A fluid storage structure according to claim 33 in which:

the water-based latex is a paste preparation.

35. A fluid storage structure according to claim 34 in which:

the adhesive layer is an acrylic based latex polymer adhesive.

36. A fluid storage structure according to claim 35 in which:

the stucco basecoat layer is a mixture of acrylic based latex polymer adhesive and Portland cement.

37. A fluid storage structure according to claim 36 in which:

the stucco topcoat layer comprises a member of the group consisting of acrylic based latex polymer adhesive and acrylic based latex polymer adhesive containing a small sized particulate inorganic aggregate.

38. A fluid storage structure according to claim 27 in which:
an epoxy coating is applied to the said one side of the structural wall before the adhesive layer is applied.

39. A fluid storage structure according to claim 27 in which:
the structural wall metal plate is a member of the group consisting of flat metal plate, single curved metal plate, double curved metal plate and combinations thereof.

40. A fluid storage structure according to claim 27 in which:
the structural wall is a part of a liquid storage tank.

41. A structure according to claim 1 in which:
the layer of insulation varies in thickness thereby providing a layered three dimensional architectural finish covering.

42. A structure according to claim 5 in which:
the separate layer of insulation varies in thickness thereby providing a three dimensional architectural finish covering.

43. A structure according to claim 5 in which:
the separate layer of insulation does not extend uniformly or continuously over the structural wall thereby providing a three dimensional architectural finish covering.

44. A structure according to claim 1 in which:
the vapor barrier layer is reinforced with a mesh material embedded in the vapor barrier layer.

45. A fluid storage structure which includes at least a portion thereof comprising a structural wall having opposing sides, at least one said side having an insulating and protecting built-up layered finish covering which retards heat transfer, the passage of water vapor and/or the condensation of water on the one said side, the built-up layered finish covering including:
a layer of expanded polystyrene insulation positioned directly against the one said side of the structural wall with said layer of insulation providing an outer surface;
a solid unitary vapor barrier layer applied as a water-based latex liquid or paste over the insulation layer; and
a stucco topcoat layer over the vapor barrier layer, the stucco topcoat layer being a member of the group consisting of acrylic based latex polymer adhesive and acrylic based latex polymer adhesive containing a small sized particulate inorganic aggregate.

46. A fluid storage structure which includes at least a portion thereof comprising a structural wall having opposing sides, the structural wall being selected from the group consisting of a metal wall and a concrete wall, at least one said side having an insulating and protecting built-up layered finish covering which retards heat transfer, the passage of water vapor and/or the condensation of water on the one said side, the built-up layered finish covering including:
a layer of expanded polystyrene insulation positioned directly against the one said side of the structural wall with said layer of insulation providing an outer surface;
a solid unitary vapor barrier layer and a stucco basecoat layer adhering to the vapor barrier layer;
one of the vapor barrier layer and the stucco basecoat layer being applied to the outer surface of the layer of insulation;
a stucco topcoat layer applied onto the outermost of the vapor barrier layer and the stucco basecoat layer;
the vapor barrier layer being applied as a viscous water-based latex liquid or paste which hardens into a solid layer;
a stucco basecoat layer being a member of the group consisting of (1) and acrylic based latex polymer adhesive and (2) a mixture of acrylic based latex polymer adhesive and Portland cement; and
the stucco topcoat layer being a member of the group consisting of acrylic based latex polymer adhesive and acrylic based latex polymer adhesive containing a small sized particulate inorganic aggregate.

47. A fluid storage structure which includes at least a portion thereof comprising a structural wall of metal plate having opposite sides, at least one said side having an insulating and protecting built-up layered finish covering which retards heat transfer through, and condensation of water on, the structural wall, the built-up layered finish covering including:
an acrylic based latex adhesive layer applied to said one side of the plate;
a layer of expanded polystyrene insulation placed over and in adhering contact with the adhesive layer thereby adhering the insulation layer to the metal plate;
a solid unitary vapor barrier layer applied to the outer surface of the insulation layer as a viscous water-based latex liquid or paste which hardens into a solid layer;
a reinforced stucco basecoat layer applied onto the vapor barrier layer, the stucco basecoat layer being a member of the group consisting of (1) and acrylic based latex polymer adhesive and (2) a mixture of acrylic based latex polymer adhesive and Portland cement; and
a stucco topcoat layer applied onto the stucco basecoat, the stucco topcoat layer being a member of the group consisting of acrylic based latex polymer adhesive and acrylic based latex polymer adhesive containing a small sized particulate inorganic aggregate.

* * * * *

UNITED STATES PATENT AND TRADEMARK OFFICE
CERTIFICATE OF CORRECTION

PATENT NO. : 5,231,811
DATED : August 3, 1993
INVENTOR(S) : ANDREPONT, ET AL.

It is certified that error appears in the above-indentified patent and that said Letters Patent is hereby corrected as shown below:

Col. 4, line 65, "foamed in-place" should be --foamed-in-place--.

Col. 5, line 29, "FIG. I" should be --FIG. 1--.

Col. 6, line 38, "I-5.5%" should be --1-5.5%--.

Col. 12, line 18, "a stucco" should be --the stucco--.

Col. 12, line 19, "(1) and" should be --(1) an--.

Col. 12, line 45, "(1) and" should be --(1) an--.

Signed and Sealed this

Eighth Day of March, 1994

Attest:

BRUCE LEHMAN

*Attesting Officer*  *Commissioner of Patents and Trademarks*